Sept. 25, 1928.                     1,685,082
                J B. GREEN
MEANS FOR STABILIZING AND MODIFYING THE METALLIC WELDING ARC
            Filed June 12, 1926
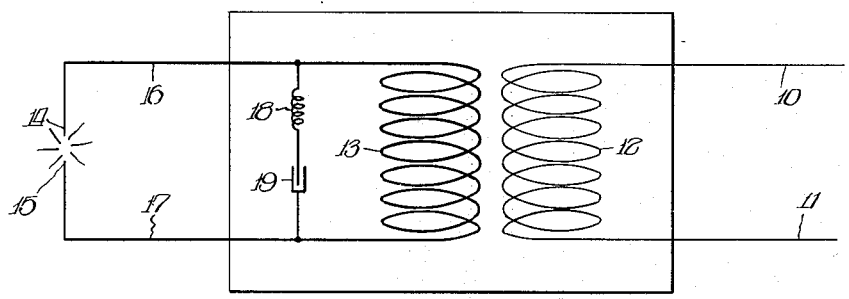
Inventor:
J Birchard Green, Patented Sept. 25, 1928.

1,685,082

UNITED STATES PATENT OFFICE.

J BIRCHARD GREEN, OF CHICAGO, ILLINOIS, ASSIGNOR TO CHICAGO STEEL & WIRE COMPANY, OF CHICAGO, ILLINOIS, A CORPORATION OF ILLINOIS.

MEANS FOR STABILIZING AND MODIFYING THE METALLIC WELDING ARC.

Application filed June 12, 1926. Serial No. 115,502.

Alternating current is more suitable for certain kinds of metallic arc welding than direct current, but has not been used extensively for that purpose because of the fact that the arc obtainable with alternating current is comparatively unstable.

The object of my invention is to provide means for increasing the stability of the alternating current metallic arc.

In metallic arc welding, the arc is maintained by the passage of an electric current through a vaporous conductor, which conductor diffuses very rapidly into the surrounding air. When an alternating current is used, the arc actually goes out, but the vaporous conductor continues to dissipate, with the result that as the current begins to rise from zero it must flow through a vaporous conductor which is diluted by air and therefore offers increased electrical resistance to such flow. This condition retards the current in building up, and if, as is often the case, the resistance becomes sufficiently great, the current cannot build up and the arc in consequence is extinguished.

The vaporous conductor through which the electric current passes to maintain the arc, quickly reaches a condition of saturation in the arc stream, and any increase in the quantity of the conductor is simply forced out of the arc stream into the surrounding air, where it has no beneficial effect upon the arc. The conductor furthermore dissipates from the arc stream at a fairly constant rate. There seems to be no way in which to increase the effectual quantity of the conductor or to retard its dissipation.

The specific resistance of the vaporous conductor can be controlled, however, and, by lowering its resistance, it may be proportionately diluted and still carry the welding current. The resistance of the vaporous conductor is lowered by introducing thereinto the vapor of second class conductors which are incorporated with the material of the electrode. Alternating current has been generally considered impractical for welding except with an electrode of this type.

By reducing the time interval during which the arc is out, less vaporous conductor is allowed to dissipate, and this reduction may be carried to the point where the current will always be able to build up again. The time interval referred to may be modified by controlling the frequency of alternation of the current and the form of the current and voltage waves. It so happens that the common commercial frequency of supply of alternating current is sixty (60) cycles and is of approximately sine wave form, which characteristics fall just short of the maximum time interval allowable in metallic arc welding for a bare electrode and just within that allowable for an electrode which has incorporated therein proper quantities of a suitable second class conductor.

I have discovered that by introducing an electrical inductance and capacity in parallel with the arc, I am able to modify the frequency of alteration and form of wave to such an extent as to permit of metallic arc welding with the ordinary commercial alternating current and a bare electrode.

In the accompanying drawing, I have shown in a very schemmatic way, a diagram of an electrical hook-up embodying one form of my invention.

The alternating current used may be of ordinary commercial frequency and enters the apparatus through two conductors 10 and 11 which connect with the primary winding 12 of the welding transformer. The secondary winding 13 of the transformer connects with two spaced welding electrodes 14 and 15 through two conductors 16 and 17. An inductance 18 and a capacity 19 connect the conductors 16 and 17 in parallel with the arc between the electrodes 14 and 15 and constitute therewith an oscillating circuit. The illustration, of course, does not show all of the detailed features of a welding apparatus, such as the usual switches, meters, protective devices, ballast coils, and the like.

The principle of the invention underlying the application of the same above described might also be of considerable value in connection with the use of a direct current, as it would provide a means for controlling the degree of penetration of the heat, permitting the welding together of thin sheets which under present methods very often burn through.

I claim:

1. An arc welding apparatus comprising a set of welding electrodes adapted to form an arc, circuit elements including inductance and capacity connected between said electrodes to constitute with the welding arc an oscillatory circuit, a source of current supply of lower frequency than said oscillatory circuit, and a connection from said source of supply to said oscillatory circuit for maintaining therein oscillations by way of the welding arc formed between said electrodes, said connection constituting the sole source of supply for said arc.

2. An arc welding apparatus comprising a set of welding electrodes, circuit elements including inductance and capacity connected between said welding electrodes to constitute with the welding arc an oscillatory circuit, and a source of current supply connected to said circuit for maintaining oscillations therein, said oscillatory circuit being the sole energy supply to said arc and being arranged to operate at a higher frequency than said source.

3. An arc welding apparatus comprising a pair of welding electrodes adapted to form a welding arc, circuit elements including a condenser and an inductance serially connected between said electrodes to constitute therewith an oscillatory circuit, a current supply source having a frequency lower than the frequency of said oscillatory circuit, and a connection from said source to said circuit for maintaining therein current oscillations by way of the arc formed between said electrodes, said connection serving as the sole supply of energy to said arc.

In testimony whereof I have hereunto subscribed my name.

J BIRCHARD GREEN.